US010496199B2

(12) United States Patent
Mazur et al.

(10) Patent No.: US 10,496,199 B2
(45) Date of Patent: Dec. 3, 2019

(54) DEVICE AND METHOD FOR CONTROLLING PLAYBACK OF DIGITAL MULTIMEDIA DATA AS WELL AS A CORRESPONDING COMPUTER-READABLE STORAGE MEDIUM AND A CORRESPONDING COMPUTER PROGRAM

(71) Applicant: NATIVE INSTRUMENTS GMBH, Berlin (DE)

(72) Inventors: James Peter Mazur, Berlin (DE); Scott Hobbs, Berlin (DE)

(73) Assignee: NATIVE INSTRUMENTS GMBH, Berlin (DE)

( * ) Notice: Subject to any disclaimer, the term of this patent is extended or adjusted under 35 U.S.C. 154(b) by 0 days.

(21) Appl. No.: 14/172,207

(22) Filed: Feb. 4, 2014

(65) Prior Publication Data
US 2014/0225845 A1 Aug. 14, 2014

(30) Foreign Application Priority Data

Feb. 8, 2013 (EP) .................................. 13154603

(51) Int. Cl.
*G06F 3/041* (2006.01)
(52) U.S. Cl.
CPC .................... *G06F 3/041* (2013.01)
(58) Field of Classification Search
CPC ............. G06F 3/04847; G06F 3/04855; G06F 3/04886; G06F 2203/04806; G06F 3/0488;
(Continued)

(56) References Cited

U.S. PATENT DOCUMENTS 7,479,949 B2 * 1/2009 Jobs et al. ................... 345/173
2002/0159375 A1 10/2002 Eguchi et al.
(Continued)

FOREIGN PATENT DOCUMENTS

FR 2 764 088 A1 12/1998
FR 2 797 518 A1 2/2001
WO 2012/167393 A1 12/2012

OTHER PUBLICATIONS

Denon DJ, Denon DJ MCX8000 User Guide, Feb. 18, 2012, D&M Holdings Inc., pp. 8, 16 and 17, denondj.com (Year: 2012).*
(Continued)

*Primary Examiner* — Dong Hui Liang
(74) *Attorney, Agent, or Firm* — Norris McLaughlin, P.A.

(57) ABSTRACT

A device for controlling playback of digital multimedia displays in first and second portion a representation of a part of the multimedia data, where in the first portion a representation of a part of the multimedia data, which is displayed on the second portion, is displayed, and where the first portion operatable in at least a first and a second mode, where
 in the first mode independently of a position of a touch point a direction and a speed of the playback is controllable in dependence of a change of the touch point, and
 in the second mode a new playback position is definable in dependence of the position of the touch point,
for displaying in the second portion a marker for indicating a neighbourhood around the playback position, and
for switching the modus of the first portion, when the marker is moved by user input.

13 Claims, 1 Drawing Sheet

(58) Field of Classification Search
CPC ...... G06F 1/1626; G06F 3/041; G06F 3/0482; G06F 17/00; G06F 3/162; G06F 3/165; G06F 3/167; G06F 16/40; G06F 16/7834; G06F 2206/20; G10H 2230/015; G10H 2220/096; G10H 2210/241; G10H 2210/076; G10H 2210/391; G10H 2240/0911; G10H 2240/0561; G10H 2240/0611; G10H 2210/086; G10H 1/0008; G10H 1/0091; G10H 2230/365; G10H 2250/615; G10H 2250/641; G10H 2220/005; G10H 2220/116; G10H 2220/161; G11B 27/005; G11B 27/034
See application file for complete search history.

(56) References Cited

U.S. PATENT DOCUMENTS

| | | | | |
|---|---|---|---|---|
| 2004/0069123 | A1* | 4/2004 | Becker | G10H 1/00 84/612 |
| 2004/0207568 | A1* | 10/2004 | Ooshima | G06F 1/162 345/1.1 |
| 2004/0254660 | A1* | 12/2004 | Seefeldt | G10H 1/40 700/94 |
| 2007/0169115 | A1* | 7/2007 | Ko | H04L 12/2803 717/174 |
| 2008/0013757 | A1* | 1/2008 | Carrier | G10H 1/0008 381/119 |
| 2009/0088877 | A1* | 4/2009 | Terauchi | G10H 1/0025 700/94 |
| 2009/0183076 | A1* | 7/2009 | Shim et al. | 715/716 |
| 2009/0199119 | A1* | 8/2009 | Park | G06F 3/04847 715/765 |
| 2010/0057235 | A1* | 3/2010 | Wang | G06F 1/1626 700/94 |
| 2010/0132536 | A1* | 6/2010 | O'Dwyer | G10H 1/0008 84/609 |
| 2010/0231537 | A1* | 9/2010 | Pisula et al. | 345/173 |
| 2011/0134032 | A1* | 6/2011 | Chiu et al. | 345/157 |
| 2012/0014673 | A1* | 1/2012 | O'Dwyer | G06F 3/0346 386/282 |
| 2012/0054612 | A1* | 3/2012 | Bok | G06F 3/0488 715/716 |
| 2012/0299814 | A1* | 11/2012 | Kwon et al. | 345/156 |
| 2013/0123961 | A1* | 5/2013 | Roman | G10H 1/0008 700/94 |
| 2013/0132838 | A1* | 5/2013 | Daisy | G06F 3/0488 715/716 |
| 2013/0319209 | A1* | 12/2013 | Good | G09B 15/04 84/483.2 |
| 2014/0288686 | A1* | 9/2014 | Sant | G06F 3/165 700/94 |

OTHER PUBLICATIONS

Ben Bowers, "Smithson Martin Emulator Multi-touch Professional DJ System", Jul. 28, 2011 (Year: 2011).*
Andrea Powell, "The Emulator—transparent touchscreen mixing desk puts DJs center stage", Nov. 28, 2011 (Year: 2011).*
Mark Settle, "The Emulator Hits OS X", Oct. 22, 2012 (Year: 2012).*
European Search Report dated Jun. 11, 2013.
European Patent Office Office Action for corresponding EP Application No. 13 154 603.8 dated Jul. 24, 2015.
Anonymous, "djay for iPadThe full-fledged iPad DJ app for Algoriddim", Jan. 1, 2015, pp. 1-9, XP055203338, Retrieved from the Internet: URL:https://www.algoriddim.com/djay-ipad, retrieved on Jul. 20, 2015.
Anonymous, "djay for iPadThe full-fledged iPad DJ app for Algoriddim", Nov. 20, 2010, pp. 1-3, XP055203340, Retrieved from the Internet: URL:http://www.web.archive.org/web/20101230082434/http://www.algoriddim.com/djay-ipad, retrieved on Jul. 20, 2015.

* cited by examiner

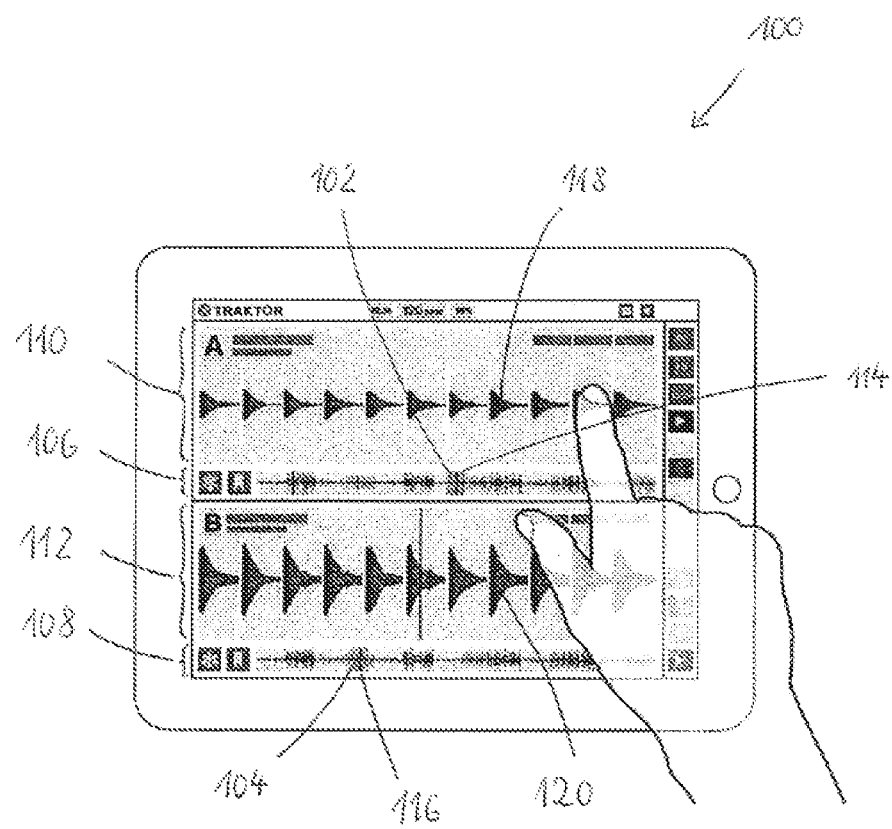

DEVICE AND METHOD FOR CONTROLLING PLAYBACK OF DIGITAL MULTIMEDIA DATA AS WELL AS A CORRESPONDING COMPUTER-READABLE STORAGE MEDIUM AND A CORRESPONDING COMPUTER PROGRAM

The invention concerns a device and a method for controlling playback of digital multimedia data as well as a corresponding computer-readable storage means and a corresponding computer program which are usable for facilitating controlling of digital multimedia data, especially of controlling digital audio data when DJing using a tablet computer.

PRIOR ART

From its early days of mixing two vinyl records together to facilitate continuous music play, to "live-producing" today, DJing has come a long way. Yet the principles of matching two pieces of music's speed and rhythm to be able to seamlessly cross-fade between them have remained the same. Today's DJs can resort to a vast collection of software and hardware controllers that resemble the workflow of "analogue" DJing, yet they can still play purely analogue with two record players and a mixer like their predecessors, or even combine both worlds by using vinyl timecode records. (By this, their "interface"—the vinyl records on a record player plus a mixer with a crossfader—remains the same, the audio playback is, however, coming from a computer that is controlled by the timecode records.)

While some software has enabled novel approaches to digital DJing (what is often referred to as "live producing") other software emulates the analogue workflow of mixing two records.

With the introduction of touch-controlled computers, especially of tablet computers, digital DJing has recently gained an additional platform. Although many of the DJ applications available for tablet computers do not yet achieve the functionality and professionalism offered by their computer-based counterparts, they have, however, become successful by offering non-professionals an easy access to DJing. Many of these applications make heavy use of skeuomorphism by displaying abstractions of record players and their corresponding tone arms, others display no abstraction of physical controls but only waveforms. They do, however, lack enhanced means for interaction, and therefore are not really applicable for professional DJing.

One application that has implemented enhanced and novel means for interaction possibilities on a waveform view is a recently introduced multi-touch sampling instrument for tablet computers. The sampling instrument enables a user to recompose samples and loops by restructuring them, altering their playback speed, layering them, adding effects, and much more. The application is, however, not providing a DJ-targeted workflow.

It is therefore an object of the invention to provide a device and a method for controlling playback of digital multimedia data and a corresponding computer program and a corresponding computer-readable storage medium, which obviate the aforedescribed disadvantages and, more particularly, which facilitate controlling of digital multimedia data by use of a portable control device.

SUMMARY OF THE INVENTION

This object is solved by the invention by the features of the independent claims. Advantageous embodiments of the invention are recited in the dependent claims.

A special advantage of the present invention consists in that precision of data input, especially defining of new playback position, is enhanced. This is achieved by a device for controlling playback of digital multimedia data, where the device comprises at least two touch-sensitive portions for data input and data output. In a preferred embodiment of the invention, at least a part of the two touch-sensitive portions is realized as touch-sensitive graphical user interface (GUI) for example as a touch screen. In a special embodiment a touch screen is subdivided into two or more touch-sensitive portions.

According to the invention, the device is configured for displaying in a first and a second portion a representation of at least part of the multimedia data. In a preferred embodiment digital audio data is represented in form of a waveform. The device is further configured for displaying in the first portion a representation of (only) a part of the multimedia data, which is displayed in the second portion. The representation in the first portion is therefore called excerpt representation, and the representation in the second portion is therefore called entire representation. According to a preferred embodiment in the second portion is a waveform of an entire track of audio data represented, while in the first portion only a section of the entire waveform is displayed. Preferably, in the first potion an area around the playback position is displayed in more detail. Preferably, the area is scalable. In a further preferred embodiment an indicator is displayed, which indicates the current playback position at which a track is played back.

According to the invention, the first portion is usable in at least a first and a second work mode. In the first mode, speed and direction of playback of a track can be controlled by user input via one of the touch-sensitive portion, where the change of the position of the point, where the user touches the touch-sensitive portion, is evaluated for controlling. The position of the point of touching on the touch-sensitive portion is in the first mode irrelevant for controlling the speed and the direction of playback, i.e. for example only the speed and the direction of a users finger motion on the touch-sensitive portion defines speed and direction of the replay irrespective of where the touch-sensitive portion is touched. In a preferred embodiment, touching the first portion is evaluated for controlling speed and direction of playback of a track. In other words: in the first mode a direction and a speed of the playback is controllable in dependence of a move of the touch point, where for controlling a change of the absolute coordinates of the touch point (for example with respect to the first portion) is evaluated and the direction and the speed of the playback is controlled independently of the absolute coordinates. According to a further preferred embodiment, the displayed representation of the multimedia data is moved according to the change of the position of touching, for example finger movement.

When the first portion is operated in the second mode, the position of the point of touching on the touch-sensitive portion is evaluated and the playback position is relocated depending from the position of the point of touching. Preferably, the touch is evaluated, if the first portion is touched, and the new playback position is set to the playback time of the track, where the finger touches the representation of the waveform of the multimedia data.

According to the invention, the second portion is configured for displaying a marker, which marks in the second portion within the representation of the multimedia data a neighbourhood of the playback position. In a preferred embodiment, the marker is realized as a frame around the playback position. Advantageously, the frame is a scalable frame. In a preferred embodiment, the representation of the multimedia data within the frame is displayed in the first portion. In this manner, the representation in the first portion can be adapted to a predefined or wished precision of the representation of the waveform within the first portion. This is especially useful for adapting the resolution of the waveform if a new playback position shall be set by user input, for example by touching with a finger the desired playback position, within the first portion. In a preferred embodiment the marker is realized as a transparent or semi-transparent overlay, which is superposed the representation of the multimedia data in the neighbourhood of the playback position.

According to the invention, the device for controlling playback of multimedia data is further configured for switching the modus of the first portion, when the marker is moved by user input.

In a preferred embodiment, within the first portion the current playback position is indicated by an indicator, for example by a line or by a cursor. Preferably, the indicator remains at a fix position, however, the representation (i.e. the waveform) moves automatically through the display of the first portion according to the progress of the playback. Advantageously, the marker within the second portion indicates a region of the entire representation of the multimedia data, where the region corresponds to the part of the excerpt waveform, which is displayed in the first region. Consequently, according to this embodiment, the marker moves automatically along the entire representation according to the progress of the playback. In the first mode, a user can move the representation of the multimedia data by a finger movement on the touch-sensitive portion. Result of such a movement is a change of speed and/or direction of the playback of the multimedia data, so called scratching.

If a user wishes to set a new playback position, the user shifts by touch gesture the marker within the second portion. The displayed representation of the multimedia data within the first portion is shifted accordingly. In this manner, the user can display within the first portion the region of the multimedia data, where the new playback position shall be set. The resolution of the excerpt representation, which is displayed in the first portion, can be adjusted, as mentioned above, by scaling the marker in the second portion. In this manner, the new playback position can be set with high accuracy.

By shifting the marker by user input, the mode of the first portion is changed into the second mode. Thus, after shifting the marker to a desired position, the user can define the new playback position by touching the representation of the multimedia data with the finger at the desired new position. Preferably, after setting the new playback position by touch gesture, the mode of the first portion is switched again to the first mode, where scratching is possible.

While DJing in general two or more sets of multimedia data are mixed. Therefore, in a preferred embodiment the device comprises at least two pairs of first and second touch sensitive portions, where different pairs of first and second portions are assigned to each of the at least two sets of multimedia data. In this manner, for example representations of a first track of digital audio data is displayed on a first pair of first and second portions, and representations of a second track of digital audio data is displayed on a second pair of first and second portions. Thus, a user of the device can set appropriate playback position for mixing in each of the tracks.

In a preferred embodiment, the device for controlling playback of digital multimedia data is designed as portable end device, for example as a tablet computer. In general the device is realized as data computing unit, where the data computing unit comprises at least a processor for executing program instructions, internal storage means for storing program code, means for data input and output and a communication interface. The data computing unit further can be combined with external storage means for storing program code. The internal or external storage means can serve as the inventive computer-readable storage means.

A method for controlling multimedia data according to the invention comprises providing at least a first and a second touch sensitive portion for data input and data output, wherein in the first and the second portion a representation of at least a part of the multimedia data is displayed, where in the first portion a representation of a part of the multimedia data, which is displayed on the second portion, is displayed. According to the inventive method in the first mode, independently of a position of a touch point, a direction and a speed of the playback is controllable in dependence of a change of the touch point, and in the second mode a new playback position is definable in dependence of the position of the touch point. In the second portion a marker is displayed for indicating on the second portion within the representation of the multimedia data a neighbourhood around the playback position, and the modus of the first portion is switched, when the marker is moved by user input. In a preferred embodiment the at least a first and a second touch sensitive portion are parts of a data processing device, preferably of a portable data processing device as for example a tablet computer.

A computer program according to the invention enables a data processing system, after the computer program has been loaded into the memory of the data processing system, to execute a method for controlling playback of digital multimedia data, wherein at least a first and a second touch sensitive portion for data input and data output is provided, and wherein in the first and the second portion a representation of at least a part of the multimedia data is displayed, where in the first portion a representation of a part of the multimedia data, which is displayed on the second portion, is displayed, and where the first portion is operatable in at least a first and a second mode, where in the first mode independently of a position of a touch point a direction and a speed of the playback is controllable in dependence of a change of the touch point, and in the second mode a new playback position is definable in dependence of the position of the touch point, and wherein in the second portion a marker is displayed for indicating on the second portion within the representation of the multimedia data a neighbourhood around the playback position, and the modus of the first portion is switched, when the marker is moved by user input.

Such computer programs may be provided, for example, for downloading (for a fee or free of charge, freely accessible or password-protected) in a data or communication network. The provided computer programs can be used with a method whereby a computer program of claim 10 is downloaded from an electronic data network such as, for example, the Internet, to a data processing system connected to the data network.

For performing the method according to the invention, a computer-readable storage means is used, on which a program is stored that enables a data processing system, after the program has been loaded to the storage means of the data processing system, to execute a method for controlling playback of digital multimedia data, wherein at least a first and a second touch sensitive portion for data input and data output is provided, and wherein in the first and the second portion a representation of at least a part of the multimedia data is displayed, where in the first portion a representation of a part of the multimedia data, which is displayed on the second portion, is displayed, and where the first portion is operatable in at least a first and a second mode, where in the first mode independently of a position of a touch point a direction and a speed of the playback is controllable in dependence of a change of the touch point, and in the second mode a new playback position is definable in dependence of the position of the touch point, and wherein in the second portion a marker is displayed for indicating on the second portion within the representation of the multimedia data a neighbourhood around the playback position, and the modus of the first portion is switched, when the marker is moved by user input.

The invention provides several advantages compared with conventional solutions. Most current DJ software is used in conjunction with a dedicated hardware controller, which provides the user with an array of buttons, knobs and faders for precise parameter control. The DJ software running on the computer usually mirrors all the hardware controller's functionality, however, during a performance it is mainly providing visual feedback, while most user interactions are carried out on the controller.

With the new touch-controlled version of the inventive controller for multimedia data, the invention takes a radical new design approach toward a less skeuomorphic aesthetic: The touch-controlled user interface of the inventive controller is dominated by two waveform view widgets. Each of this waveform views shows an excerpt (excerpt-waveform) of the song that is currently playing in the corresponding deck. Underneath each of the excerpt-waveform views, a much smaller widget displays the waveform of the entire song (entire-waveform). Other DJ software usually also displays both waveform views, they are, however, way less dominant to other user interface elements.

As the touch-controlled inventive controller needs to be used standalone without a dedicated hardware controller, its user interface alone enables DJs to precisely control all the functionality required, with only their fingers on a touch screen as primary means of interaction. Therefore, several new interaction methods needed to be conceived, with the two waveform views as main interaction surfaces.

Exemplary embodiments of the invention will now be described in more detail with reference to the appended FIGURE, which show in FIG. 1 an exemplary user interface of a device for controlling digital music data, where two dominating excerpt-waveform views, and their corresponding entire-waveform views underneath are depicted.

Particular embodiments of the invention will now be described in more detail. The following specification details five novel interaction methods of the touch-controlled inventive controller, each with an explanation in which the method differs from the state-of-the-art in DJ software. While the invention is described with the help of an example where digital music data is controlled, the invention is not limited to controlling digital music data, but the present invention comprises controlling of any multimedia data.

Audio Waveform View and Playback Position Decoupling for In-beat On-the-fly Play-position Relocation While DJing, during playing back one or more tracks a DJ will intervene, modify or manipulate the play back. For example, a currently playing track is scratched, e.g. speed and/or direction of the play back of the track are changed, or the DJ will continue the currently playing track at a new play back position (on-the-fly play-position relocation).

For DJ interaction for controlling play back of a track, electronic devices with a touch-sensitive user interface, e.g. a touch-sensitive display, are available. On the touch-sensitive user interface one or more waveform views for at least a part of the one or more tracks are displayed. In a preferred embodiment, at least one (excerpt-)waveform view moves through the user interface according to the progress of the play back. Preferably, also a (entire-)waveform view is displayed in addition to the (excerpt-)waveform view. The (entire-)waveform view may be a statically displayed on the user interface.

On-the-fly play-position relocation in DJ software is usually performed by clicking onto the desired new position in the entire-waveform view. Clicking and dragging the excerpt-waveform view usually brings DJ software into scratch mode, in which the new playback speed and direction is determined by the user's subsequent mouse movement.

On a touch-based input device however, touching the entire-waveform view at a desired position for on-the-fly play-position relocation would be too imprecise due to the accuracy shortcomings of the conventional input method. Hence for the touch-based inventive control device 100, a new method for on-the-fly play-position relocation is proposed:

A semi-transparent overlay (excerpt-overlay 102, 104) on the entire-waveform view 106, 108 displays which part of the song is currently shown in the excerpt-waveform view 110, 112. Additionally, the entire-waveform view 106, 108 displays a play cursor 114, 116 indicating the current playback position of the song.

The user can use two finger spreading and pinching gestures on the entire-waveform view 106, 108 to adjust the length of the section that is shown in the excerpt-waveform view 110, 112.

In normal "play" mode, the section displayed in the excerpt-waveform view 110, 112 moves along with the play cursor 114, 116, making the displayed waveform 118, 120 scroll through the view's screen estate. If the user touches the excerpt-waveform view 110, 112 in normal "play" mode, the underlying waveform 118, 120 stops scrolling and its play position is now dependent on the user's finger movement (but not from the absolute position of the finger on the excerpt-waveform view 110, 112), enabling the user to scratch the audio. Scratching will continue the playback from the current playback position (at the time of touching the excerpt-waveform view 110, 112), but speed and direction depends from the speed and direction of the finger movement on the excerpt-waveform view 110, 112.

To bring a portion of the waveform that is not centred around the current play cursor 114, 116 position into view, the user can reposition the excerpt-overlay 102, 104. In this "seek" mode, the excerpt-waveform view 110, 112 is static. By now tapping on the excerpt-waveform view 110, 112, the user can not scratch, but set a new playback position. Due to the higher time-resolution of the excerpt-waveform view 110, 112, the touch-based input method yields enough accuracy for precise play-position relocation.

Once the user has set a new play-position, the control device takes over playback from this position in sync with the beat-phase. At the time the audio engine has taken over playback at the new position, the excerpt-waveform view 110, 112 starts scrolling again, letting the user scratch the audio the next time he touches the excerpt-waveform view 110, 112.

The novelty of this concept is that the user can still scratch audio by touching on the excerpt-waveform view 110, 112, however, by repositioning the excerpt overlay 102, 104 still use the excerpt-views higher resolution over the audio material to precisely set a new playback position.

Dynamic Beat Grid Segmentation Based on an Audio Waveform View's Zoom Factor

Most conventional DJ software displays a visual beat-grid pattern on top of a waveform view. The beat-grid is usually based on an automated analysis of the audio data, and aids to indicate where the beats and the bars are located in the audio material. This can give visual cues to a DJ who manually beat-syncs two tracks. Apart from that, most conventional DJ software uses the beat-grid to auto-synchronize two songs that are playing simultaneously.

A DJ technique that has gained momentum with digital DJing is the so-called cue-point juggling, or cue-point drumming. For this technique, the DJ pre-defines cue-points in a track, and, while performing, repeatedly jumps playback between the positions of the cue-points by pressing the cue-point's corresponding buttons on a hardware controller.

When a number of cue-points are in line with the beats, and correspond to e.g. a kick drum, snare and hi-hat hit in the underlying audio material, the DJ can quite effectively remix a track using the cue-points while staying in synchronisation with the overall tempo and rhythm of his performance. The cue-points are then played very similar to drum samples in a digital drum machine, hence the term cue-point drumming.

The touch-controlled inventive control device introduces a new way of remixing tracks on-the-fly called beat-grid drumming: A DJ can by touching a dedicated widget on the screen switch the excerpt-waveform view 110, 112 into "freeze-mode", in which the currently displayed portion of the waveform 118, 120 stops scrolling. The DJ can then play the different parts of the waveform 118, 120, which is visually divided by the beat-grid, by touching the area between two successive beat-grid markers. In this mode, each of the beat-grid lines functions as a virtual cue-point, and each of the areas between the beat-grid lines as a button to trigger playback of the corresponding audio material. As the beat-grid is auto-detected, the DJ does not need to pre-define cue-points in order to use this routine.

An additional novelty of this concept is that the resolution of the beat-grid is dependant on the duration and tempo of the audio material displayed in the excerpt-waveform view 110, 112. Usually a beat-grid in conventional DJ software displays only one marker per beat, and, hence due to the common 4/4 measure in modern dance music, 4 beats per bar. As a user can define the length of the section of the song that is shown in the excerpt-waveform view 110, 112 by a two-finger spreading and pinching gesture on the entire-waveform view 106, 108, it is possible that the displayed waveform 118, 120 represents audio of a duration between less than a bar up to multiple bars.

If more than two bars of audio are visible, the beat-grid is subdivided into one-bar parts. With lesser bars of audio visible, the beat-grid is dynamically subdivided into smaller portions, i.e. depending on the zoom level, additional markers for half, quarter, and eight-beats become visible. Therefore a user can at a high zoom level use the beat-grid drumming technique to trigger parts of the audio material that begin offbeat, whereas on a low zoom level, only audio parts that begin with a beat can be triggered.

Conventional DJ software does not allow for this functionality at all. The concept is novel in two ways: Employing the beat-grid for automated and dynamic cue-point setting, and dynamically refining the beat-grid based on the level of detail in a waveform view.

Loop Selection on an Audio Waveform View Using Two-finger Touch Gestures

Another routine commonly used by DJs in conjunction with digital DJ software is on-the-fly looping of a played song: Many conventional DJ routines include looping one portion of one track while playing another track over the loop, or shortening a currently playing loop over time to achieve tension in a mix.

Conventionally, DJ software provides dedicated software controls to set in- and out-points for loops, and additional shortcuts to set loops of different duration, e.g. 4 bars, 2 beats, or different musically meaningful subdivisions of one beat. The touch-controlled inventive control device does not provide the user with dedicated software controls for setting loops of different lengths, but with only one dedicated loop button that will always engage a loop of a pre-defined length (commonly a four-bar loop, the length of a phrase in modern dance music) from the current playback position when tapped, or release that loop again.

If the user wants to engage a loop of a different length than the four-bars as controlled with the loop button, he can use a two-finger tap gesture on the excerpt-waveform view 110, 112, whereby the distance between the user fingers in conjunction with the current zoom level is defining the length of the loop. The loop is quantized to the granularity of the currently displayed beat-grid.

After the user has engaged a loop, the length of the loop is displayed by a semi-transparent visual overlay on top of the excerpt-waveform view. To disengage the loop, the user can again two-finger tap the overlay, or he can tap the dedicated loop button.

Conventional DJ software does not allow for directly setting a loop visually on a waveform view.

Loop Length Adjustment on an Audio Waveform View Using Touch Gestures

Once a user has engaged a loop over the currently playing audio material, the length of the loop is adjustable. To modify the length of the loop, the user can with a two finger pinch or spread gesture modify the length of the loop overlay on the excerpt-waveform view. The newly set loop length is still quantized to the current beat-grid's level of detail.

Conventional DJ software does not allow for a direct visual adjustment of the length of a loop, but dedicated buttons enable a user to adjust the length of a loop.

Loop Slice Playback on an Audio Waveform View Using Touch Gestures

Once a user has engaged a loop over the currently playing audio material, the user can additionally switch the excerpt-waveform view into "freeze-mode". In this mode, the waveform representation of the looped region is spread out over the entire excerpt-waveform view, split into slices by the dynamic beat-grid markers. The duration of each slice is therefore depending on the initial length of the engaged loop. Without further interaction, the playback position keeps looping over the displayed waveform. If the user touches a slice, only this slice keeps looping. If a user uses two fingers, the slices between the two touch points are looping. The user can adjust the looped "area" by pinch or spread gestures.

Differently from play mode in "freeze-mode" without an additionally engaged loop, the playback of a slice after a user touched it is not quantized to the beat of the audio material, but starting immediately. Further, if a user lifts the finger(s) from the touch screen, the playback is not resumed from the current playback position, but from the position in the loop where the playhead would currently be had the user not further interacted ("flux-mode").

Beat Grid Position Adjustment on an Audio Waveform View Using Touch Gestures

Most conventional DJ software performs beat-grid analysis on the basis of lowlevel onset event and periodicity information from beat tracking on the audio data. These analysis methods generally yield results with a high-enough accuracy for beat-gridding of most standard dance music.

If the beat-pattern of the analyzed music material is, however, non-conformist, the analysis results might be imprecise and even outright wrong. An example for a nonconformist beat-pattern would be that e.g. the kick drum of a drum beat is placed on the musical "two", which might result that the beat-grid is off by one beat, i.e. that the "downbeat"—the musical "one" of the beat—is misrecognized.

The touch-controlled inventive control device provides the DJ with means to correct an inaccurate beat-grid. Similar to what most current DJ software provide, the DJ can tap the tempo of the song in order to correct for a wrongly identified tempo, or half/double the recognized beat-grid's resolution to correct analysis mistakes due to e.g. a half-time drum beat.

On top of that, the touch-controlled inventive control device provides a novel way to correct for a misrecognized downbeat: On a dedicated beat-grid correction screen that can be brought into view, the user can displace the audio waveform of the song against the beat-grid using a swiping gesture. This interaction concept is novel to other DJ software in that the user does not have to delete a misrecognized beat-grid and manually set a new downbeat marker and the beats per minutes, but can reuse the mostly correctly recognized beat-pattern while just intuitively shifting the downbeat marker against the audio waveform.

The invention claimed is:

1. A device for controlling playback of digital multimedia data, the device comprising at least a first touch sensitive display portion and a second touch sensitive display portion, wherein the first and second touch sensitive display portions are configured for receiving data input and displaying data as output,
    wherein the device is configured
    for displaying, in the first and the second display portions, one or more representations of at least a part of the multimedia data, wherein the multimedia data is represented in a form of a waveform, wherein, in the first display portion, an excerpt representation of a part of the multimedia data is displayed and, in the second display, an entire representation of the multimedia data is displayed, wherein the excerpt representation is displayed in more detail than the entire representation, wherein the part of the multimedia data surrounds a current playback position, and wherein the first display portion is operable in at least a first mode and a second mode, where
        in the first mode independently of a position of a touch point, a direction and a speed of the playback is controllable in dependence of a change of the touch point, and
        in the second mode, a new playback position of the multimedia data is definable during playback of the multimedia data at a current playback position of the multimedia data in dependence of the position of the touch point, such that once and as soon as a new playback position is defined during playback of the multimedia data, the device takes over playback from the new playback position defined in dependence of the position of the touch point in sync with the beat-phase of the current playback position of the playback,
    wherein the device is configured
    for displaying, in the second display portion, a marker for indicating, on the second display portion within the entire representation of the multimedia data, a neighborhood around the playback position and the marker indicates a region of the entire representation of the multimedia data, wherein the region corresponds to part of the excerpt waveform displayed in the first display portion, and
    further wherein the device is configured for switching the mode of the first display portion, when the marker is moved by user input.

2. The device according to claim 1, wherein the device is configured for setting the at least one first display portion from the second mode into the first mode in reaction of a user input into the at least one first display portion.

3. The device according to claim 1, wherein the device is configured for displaying the representation in a predefined resolution within the first display portion.

4. The device according to claim 1, wherein the marker is realized as a frame and the device is configured in such a way that the representation, which is displayed on the first display portion, corresponds to the representation, which is displayed in the frame.

5. The device according to claim 1, wherein the device is configured for changing the size of the marker in reaction of a user input via the first or second touch sensitive display portion.

6. The device according to claim 1, wherein the device is configured for displaying, at least in one of the first and second display portion, an indicator for indicating the current playback position within the multimedia data.

7. The device according to claim 1, wherein the device comprises at least two first and at least two second touch sensitive portions, wherein a first pair of first and second portions representations of a first set of multimedia data, and in a second pair of first and second portions representations of a second set of multimedia data is displayed.

8. The device according to claim 1, wherein the device is realized as a portable data processing unit.

9. The device according to claim 1, wherein the marker, displayed in the second display portion, is a frame around the playback position and said frame is a scalable frame.

10. The device according to claim 1, wherein the marker, displayed in the second display portion, is a transparent or semi-transparent overlay superposing the entire representation of the multimedia data in the neighborhood of the playback position.

11. A method for controlling playback of digital multimedia data, the method comprising:
    providing at least a first touch sensitive display portion and a second touch sensitive display portion, wherein the first and second display portions receive data input and display data output;
    displaying, in the first and the second display portions, one or more representations of at least a part of the multimedia data, wherein the multimedia data is represented in a form of a waveform, wherein, in the first display portion, an excerpt representation of a part of the multimedia data around a playback position is displayed and, in the second display portion, an entire representation of the multimedia data is displayed, wherein the excerpt representation is displayed in more detail than the entire representation, and wherein the first display portion is operable in at least a first mode and a second mode, where in the first mode independently of a position of a touch point, a direction and a speed of the playback is controllable in dependence of a change of the touch point, and in the second mode, a new playback position of the multimedia data is definable during playback of the multimedia data at a current playback position of the multimedia data in dependence of the position of the touch point, such that, once and as soon as a new playback position is defined during playback of the multimedia data, playback is taken over from the new playback position defined in dependence of the position of the touch point in sync with the beat-phase of the current playback position of the playback;

displaying, in the second display portions a marker for indicating, on the second display portion within the entire representation of the multimedia data, a neighborhood around the playback position;

switching the mode of the first display portion, when the marker is moved by user input; and scrolling of an excerpt-waveform view starts at the time the playback is taken over at the new playback position, wherein the excerpt-waveform view is associated with the excerpt representation of the part of the multimedia data and displayable in the first display portion.

12. A non-transitory computer readable storage medium storing instructions, which when executed by one or more processors, cause the one or more processors to execute the method according to claim 11.

13. The method according to claim 11, further comprising:

changing at least one of the speed and the direction of the playback of the multimedia data by touching or contacting the excerpt-waveform view displayed in the first display portion.

\* \* \* \* \*